United States Patent
Peters

[11] Patent Number: 5,890,314
[45] Date of Patent: Apr. 6, 1999

[54] SELF-SETTING HOOK CONFIGURATION FOR WEEDLESS FISHING LURES

[76] Inventor: Stuart K. Peters, 308 Laurie Dr., Beech Island, S.C. 29841

[21] Appl. No.: 938,892

[22] Filed: Sep. 26, 1997

Related U.S. Application Data

[63] Continuation of Ser. No. 683,854, Jul. 19, 1996, abandoned.

[51] Int. Cl.⁶ ................................................ A01K 83/02
[52] U.S. Cl. ..................................... 43/36; 43/37; 43/35
[58] Field of Search ..................... 43/35, 36, 37

[56] References Cited

U.S. PATENT DOCUMENTS

| | | | |
|---|---|---|---|
| 1,197,820 | 9/1916 | Guise | 43/35 |
| 1,437,694 | 12/1922 | Traver | 43/35 |
| 1,462,949 | 7/1923 | Walls | 43/36 |
| 1,464,387 | 8/1923 | Kishpaugh | 43/36 |
| 1,638,923 | 8/1927 | Danielson | 43/37 |
| 2,256,088 | 9/1941 | Hogan | 43/36 |
| 2,325,247 | 7/1943 | Helfenstein | 43/36 |
| 3,492,752 | 2/1970 | Viveiros | 43/36 |
| 4,873,781 | 10/1989 | Bates | 43/37 |

FOREIGN PATENT DOCUMENTS

| | | | |
|---|---|---|---|
| 148351 | 1/1955 | U.S.S.R. | 43/35 |
| 5757 | 3/1895 | United Kingdom | 43/35 |

Primary Examiner—Michael J. Carone
Assistant Examiner—Arpad Fabian Kovacs
Attorney, Agent, or Firm—Laurence R. Brown

[57] ABSTRACT

A novel hook assembly forms two hooks at the end of a single elastic length of wire which spreads the hooks elastically apart in a fish hooking posture. This hook forms the active mechanism of a weedless, self setting fishing lure, where the hooks are compressed for retention weedlessly within a hollow lure in one stable position and are released by a tug on the line from a fish bite to spring the hooks apart and set the hooks in the fish. The novel simplified weedless lure array employs a spring biassed dual-hook assembly and latch permitting the two hooks to be cocked into an elastically biased weed free bistable position inside the lure for automatic triggered release by a tug on the fishline to catch a striking fish by snapping the hooks into a second bistable position with the two hooks forced outside the lure into the fish's mouth.

7 Claims, 1 Drawing Sheet

SELF-SETTING HOOK CONFIGURATION FOR WEEDLESS FISHING LURES

This application is a continuation, of application Ser. No. 08/683,854, filed Jul. 19, 1996, now abandoned.

TECHNICAL FIELD:

This invention relates to fish hook configurations, and more particularly it relates to fish hook configurations that constitute primarily the active mechanism for transforming a weedless lure into a self setting hooking device in response to fish bites.

BACKGROUND ART

There are various kinds of weedless fishing lures known in the art having retracted hooks disposed inside a lure body that will be snapped open when a fish bites to hook the fish.

In general some of the problems encountered with these lures include: (a) the tendency for hooks to return to the retracted weedless position after initially opening in response to a fish bite; (b) the inability to use a lure both for surface fishing about brush or weeds and for deeper water diving when retrieved in a trolling mode; (c) complex mechanisms difficult to assemble and keep operative; (d) unfavorable orientation of hooks or barbs for hooking and retrieving fish; and (e) mechanisms that involve moving parts subject to excessive corrosion and maintenance under practical conditions of use for fishing, for example.

Spring biassed two-hook arrays have been proposed by H. Vivieros in U.S. Pat. No. 3,492,752, Feb. 3, 1970 for Hook Mechanism for Capturing Fish and other Animals to operate in a mode where an array of two baited hooks attachable directly to a fish line may be releasably held together by a latch that is released to spring the two hooks apart when a fish takes the bait. However this lure has the deficiencies (a) that the hooks may be released to remove the hooks from a fish's mouth except when a fish chooses to mouth both hooks from a direction axially towards the fish line, (b) that the latching mechanism is so unstable that the array is subject to false triggering and snagging whenever the array lightly contacts, weeds, brush or other obstacles in the water, and (c) that the array is not adaptable to surface trolling since water based forces tend to falsely trigger the array.

Hook arrays on artificial bait fishing lures have been arranged for weed free trolling with various mechanisms that release the hooks for catching a fish that strikes at the lure. Typical is the J. Helfenstein U.S. Pat. No. 2,325,247, Jul. 27, 1943 for Combination Fishhook, wherein a trigger plate movable within the lure must be grasped by a fish to release a pair of separate hooks biased for moving outwardly from a weed free position inside the lure. This lure has the deficiency of a critical triggering mechanism that is subject to corrosion and malfunction and which requires a critical fish to bite that must grasp a trigger on the lure and move it longitudinally within the lure.

It is an objective of the present invention to improve the state of the art for weedless self-setting lures by correction of the foregoing problems.

It is a general objective of the invention to provide weedless fishing lures with simplified, easy-to-assemble fish bite actuated spring hook arrays that more reliably respond to fish strikes at the lure.

Other objects, features and objectives of the invention will be found throughout the following description, the drawings and the claims.

BRIEF DISCLOSURE OF THE INVENTION

The novel simplified weedless lure array of this invention employs a spring biassed dual-hook assembly with accompanying latch tabs permitting the two hooks to be cocked into an elastically biased weed free bistable position inside the lure, subject to automatic triggered release by a tug on the fishline to catch a striking fish by snapping the hooks into a second bistable position with the two hooks forced outside the lure into the fish's mouth.

Thus, two hooks formed at the end of a single elastic length of wire which spreads the hooks elastically apart in a first stable V-shaped fish catching position have respective catch tabs for holding the hooks mated and cocked together in a spring biased second stable position inside the thus weedless lure awaiting a fish strike. This hook and a biassing spring for urging the hooks into the cocked second stable position awaiting a tug on the line as a release trigger simply forms the active mechanism of the weedless, easily assembled fishing lure of this invention.

THE PREFERRED EMBODIMENT

Figure 1:
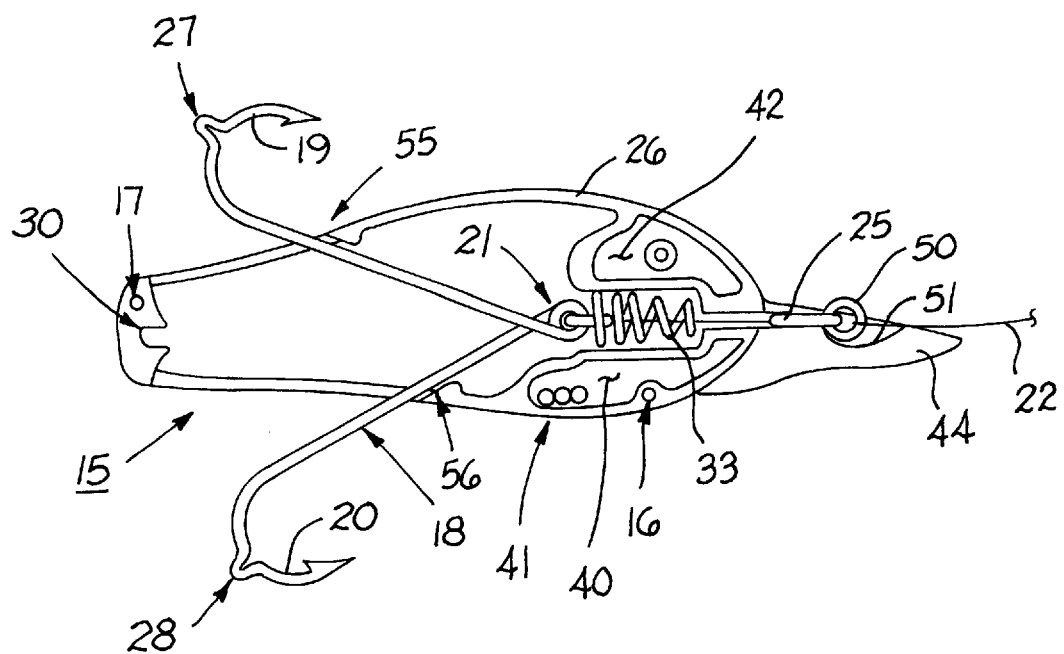
In FIG. 1, a side view, looking into one half of the weedless fishing lure of this invention, shows the interior arrangement of the weedless hook array positioned in one of its stable positions, namely the triggered position for hooking a fish.

The weedless fishing lure is formed of two mirror image halves pinned together at the pins 16, 17 to encompass the bistably configured hook array, only one half being shown. The hook assembly heart that simplifies the weedless lure of this invention is the array of two hooks 19, 20, formed at each end of a length of spring wire 18. This hook array is configured to elastically bias the hooks outwardly into the illustrated V-shaped configuration about an intermediate eyelet apex 21 formed by the spring wire 18. This eyelet 21 is for attachment to a fishing line 22, which in this embodiment is by way of the intermediate eyeletted link 25 which axially slides in the journalling nose end aperture through the hollow lure body 26.

The releasable latching means of this embodiment for holding the hooks 19 and 20 in their bistable weedless position comprises the respective tabs 27, 28 formed respectively on hooks 19 and 20. A corresponding latching member for holding the hooks in their weedless stable position comprises the notched slot 30 disposed normal to the drawing in the tail end of the lure body, into which the tabs 27, 28 are manually inserted to cock the automatically triggered fish catching trap. Because of the spring biased hook array forcing the hooks outwardly in the other stable position which is shown in the drawing, the hooks retained adjacent each other in mated position within the lure hollow bodies thereby comprise self contained spring biased releasable hook setting means that spring outwardly from the lures in response to a fish bite.

To manually cock the hook array, the hooks are squeezed together as the line 22 is pulled against the biasing spring 33, and the line 22 is then released to mate the catch tabs 27, 28 for both hooks into the notch 30 where they are held in place by the force of biasing spring 33 toward the tail end of the lure. The spring force of the spring wire 18 forming the hooks 19, 20, partly provided by the coiled eyelet 21, is thus overcome until the hooks are moved forward in the lure far enough to disengage them from the latching slot 30. That occurs whenever a fish strikes the lure and thus gives a tug on fish line 22 overcoming the latching bias of spring 33, so that the hooks because of their own elasticity snap outwardly to set the hooks in the mouth of the fish striking the lure 15. Note that the barbed ends of both hooks extend outwardly from the body of the lure 15, when released into the fish catching stable position. Since the hooks are confined within the tail end of the hollow lure in the trolling mode, they avoid snagging on underwater objects such as weeds or brush.

Other features of this lure preferably include the rattle cage 40 with its noise producing pellets 41, and a buoyancy chamber 42 that preferably carries a bladder. The optional diving bill 44 permits the lure to be trolled underwater at a depth permitted by the buoyancy chamber configuration and the bill characteristics.

As seen from looking into the shown half of the lure, the lure 15 is simply assembled without criticality, with the spring 33 being slightly compressed as the fish line connecting eyelet 50 mates into the notch 51 above the bill 44. The hook array is elastically squeezed together so that the hook shanks rest against the respective flanges 55, 56 defining the outward limits of the hooks in the fish catching stable position.

Having therefore improved the state of the art, those features of novelty identifying the nature and spirit of the invention are set forth with particularity in the following claims.

I claim:

1. A hook assembly adapted for mounting in weedless hook lures comprising in combination, an array of two hooks formed at each end of a length of spring wire which is configured to elastically bias the hooks outwardly with criss-crossed hook shanks arranged in a V-shaped configuration extending from the criss-crossed shanks positioned adjacent an intermediate eyelet apex formed in the wire for attachment to a fishing line, releasable latching means formed on said hooks for retaining the hooks adjacent each other in mated position within the lures thereby comprising releasable hook setting means for springing outwardly from the lures in response to a fish bite.

2. A weedless lure comprising in combination, an array of two hooks formed at each end of a length of spring wire which is configured to elastically bias the two hooks outwardly with criss-crossed hook shanks in a substantially V-shaped configuration having an intermediate eyelet apex formed in the wire for attachment to a fishing line, a hollow lure body being configured to encompass the two hooks weedlessly thereinside when said elastic bias is overcome and the two hooks are compressed within the lure body, said lure body being further configured with slots in the lure body to permit the hook shanks to spring outwardly from the compressed position by force of said elastic bias to position the two hooks outside the lure body for hooking fish, and means adapted to attach the lure to a fishing line including hook positioning means comprising a spring biasing member connected between said eyelet and fish line for removably holding the hooks in a latched position inside the lure body ready to spring outwardly by tugs overcoming its spring bias exerted on said fishing line and a latching member mounted on the lure in a configuration that disengages and releases the hooks automatically to spring outwardly from the lure body when a fish bite exerts a tug on said fishing line overcoming the spring bias of said spring biasing member.

3. A fishing lure comprising in combination: a shaped hollow body floatable at a predetermined water depth, said body having a longitudinal axis, a set of two joined hooks elastically biased to spread the hooks apart into a first stable position outside the hollow body adapted to hook and retain a fish, said hooks being configured to be confined into a second stable weedless biased position within the hollow body and having an eye common to both hooks disposed along said axis for connection to a fishing line, latching means for holding the hooks releasably within the hollow body in said second stable position, unlatching means for releasing the latching means in response to a tug on said fishing line when connected to said eye to attain said first stable position, said latching means further comprising a coil spring biasing member disposed along said axis between the eye and an attached fish line for urging the hooks into said second stable position to await said tug when a fish encounters said lure, whereby the hooks are automatically released when a fish strikes to move the hooks into position to hook the fish.

4. A fish lure as defined in claim 3 wherein the hooks are arranged in a hook configuration wherein the two hooks have a shank extending from said eye common to both hooks and barbed ends on the respective hooks extending outwardly from the lure and shank.

5. A simplified weedless fishing lure array comprising in combination: a lure body, a spring biased dual-hook assembly holding two hooks elastically spread into substantially a V-shaped array with a fish line attaching eyelet apex, a latching biasing spring connected between the eyelet and the fish line for urging the two hooks into a weed free bistable catch position inside the lure body, and automatic triggered release means responsive to said biasing spring for releasing the hooks from the weed free bistable catch position inside the lure body when the biasing spring is overcome in response to a tug on the fish line to automatically spread the hooks into a second bistable position, namely said V-shaped array with the two hooks outside the lure body.

6. The lure array of claim 5 wherein said eyelet apex further comprises a coiled spring formed in a single length of wire forming the two hooks thereby for automatically spreading the hooks into said second bistable position.

7. The lure array of claim 6 wherein the two hooks have shanks that criss-cross near said eyelet apex when the hooks are spread into said second bistable position.

* * * * *